United States Patent [19]

Haymond

[11] Patent Number: 5,148,153
[45] Date of Patent: Sep. 15, 1992

[54] AUTOMATIC SCREEN BLANKING IN A MOBILE RADIO DATA TERMINAL

[75] Inventor: William D. Haymond, Surrey, Canada

[73] Assignee: Motorola Inc., Schaumburg, Ill.

[21] Appl. No.: 630,664

[22] Filed: Dec. 20, 1990

[51] Int. Cl.⁵ .......................... G09G 1/28; H04N 1/42
[52] U.S. Cl. ..................................... 340/711; 340/461; 340/825.34; 340/988; 379/53; 379/96
[58] Field of Search .................... 340/711, 705, 825.34, 340/905, 988, 996, 980, 461; 455/154, 156, 158, 345; 379/59, 63, 96, 53, 54

[56] References Cited

U.S. PATENT DOCUMENTS

| | | |
|---|---|---|
| 4,843,622 | 6/1989 | Yotsutani et al. ...................... 379/59 |
| 4,908,611 | 3/1990 | Iino ..................................... 340/705 |
| 5,032,828 | 7/1991 | Hirose et al. ......................... 340/701 |

Primary Examiner—Ulysses Weldon
Assistant Examiner—Amare Mengistu
Attorney, Agent, or Firm—Donald B. Southard

[57] ABSTRACT

A data processing device is disclosed which includes automatic screen blanking and keyboard deactivation during those times whenever the associated vehicle in which the data device is installed is detected as being in motion. Further, when a message is received while the vehicle is in motion and the display screen blanked, an audible signal is generated to announce the receipt of such received message as well as providing an indication to the user/driver of the vehicle as to the nature of such received call. All keyboard interrupts generated during the time the vehicle is in motion and the visual display blanked are simply ignored.

10 Claims, 3 Drawing Sheets

AUTOMATIC SCREEN BLANKING IN A MOBILE RADIO DATA TERMINAL

FIELD OF THE INVENTION

The present invention relates in general to vehicular mounted devices having a display screen, such as a Mobile Radio Data Terminal, and more particularly, for an automatic screen blanking arrangement for such radio data terminals whenever the associated vehicle is detected as being in motion.

BACKGROUND OF THE INVENTION

A typical Mobile Radio Data Terminal for vehicular installation has an internal signal processing unit, a radio transmitter and receiver, as well as a display screen, and an externally accessible keyboard. The terminal is designed to communicate with an associated host computer over a designated radio channel. When a message is received, it is conventionally displayed on the screen for user dissemination. Concurrently, if a message is initiated at the Mobile Data Terminal, it is likewise displayed on the screen prior to transmission thereof.

It will be readily appreciated that an incoming message which is placed on the display screen may well distract a user/driver while the vehicle is in motion. Similarly, an obvious hazard is evident should the driver/user of the vehicle attempt to input a message by keyboard while the vehicle is moving. Yet, rendering the Mobile Data Terminal incapable of processing a message during vehicular motion will simply deny communication in its entirety, an obvious undesirable condition.

Accordingly, what is needed is an arrangement that disables both the display screen and keyboard input during those times the associated vehicle is in motion, yet provides some indication to the driver when a message has in fact been received and at least some information as to the nature of such received, but undisplayed message.

SUMMARY OF THE INVENTION

In one aspect of the invention a data processing device with integral visual display is provided which includes automatic screen blanking during vehicular motion and wherein means for detecting such vehicular motion is effected so as to deactivate the visual display as well as the associated keyboard input capability, and wherein any incoming message received by the data terminal during which its display screen is so deactivated results in an audible alert effective to indicate the receipt of a message and the nature thereof in accordance with the type of the alert or, alternatively, with predetermined indicators or information stored in the data terminal itself.

DETAILED DESCRIPTION OF THE PREFERRED EMBODIMENT

Figure 1:
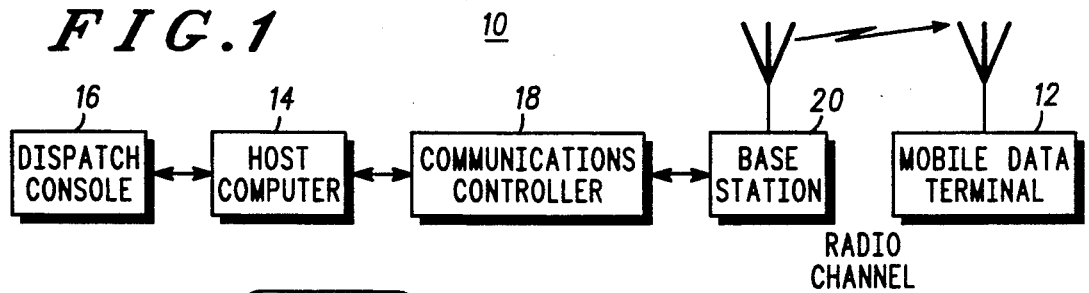
FIG. 1 is a block diagram of a typical radio data communication system in which an associated Mobile Radio Data Terminal communicates with a host computer over a radio channel.

Preferring now to the drawings, a Radio Data Communication System 10 is shown in FIG. 1 which in generalized fashion may be considered as typical of those systems currently in use. It is the Mobile Radio Data Terminal 12 particularly that has been constructed in accordance with the present invention.

System 10, as shown, permits communication between a System Mobile Radio Data Terminal 12 and a centralized host computer, indicated at 14, over a selected radio channel. More often than not, the operation is in computer aided dispatch mode so that an associated Dispatch Console 16 will be provided with appropriate dispatch application software programming in place and utilized. The communications link is completed with an appropriate centralized Communication Controller 18 operating in conjunction with a Radio Base Station 20.

Figure 2:
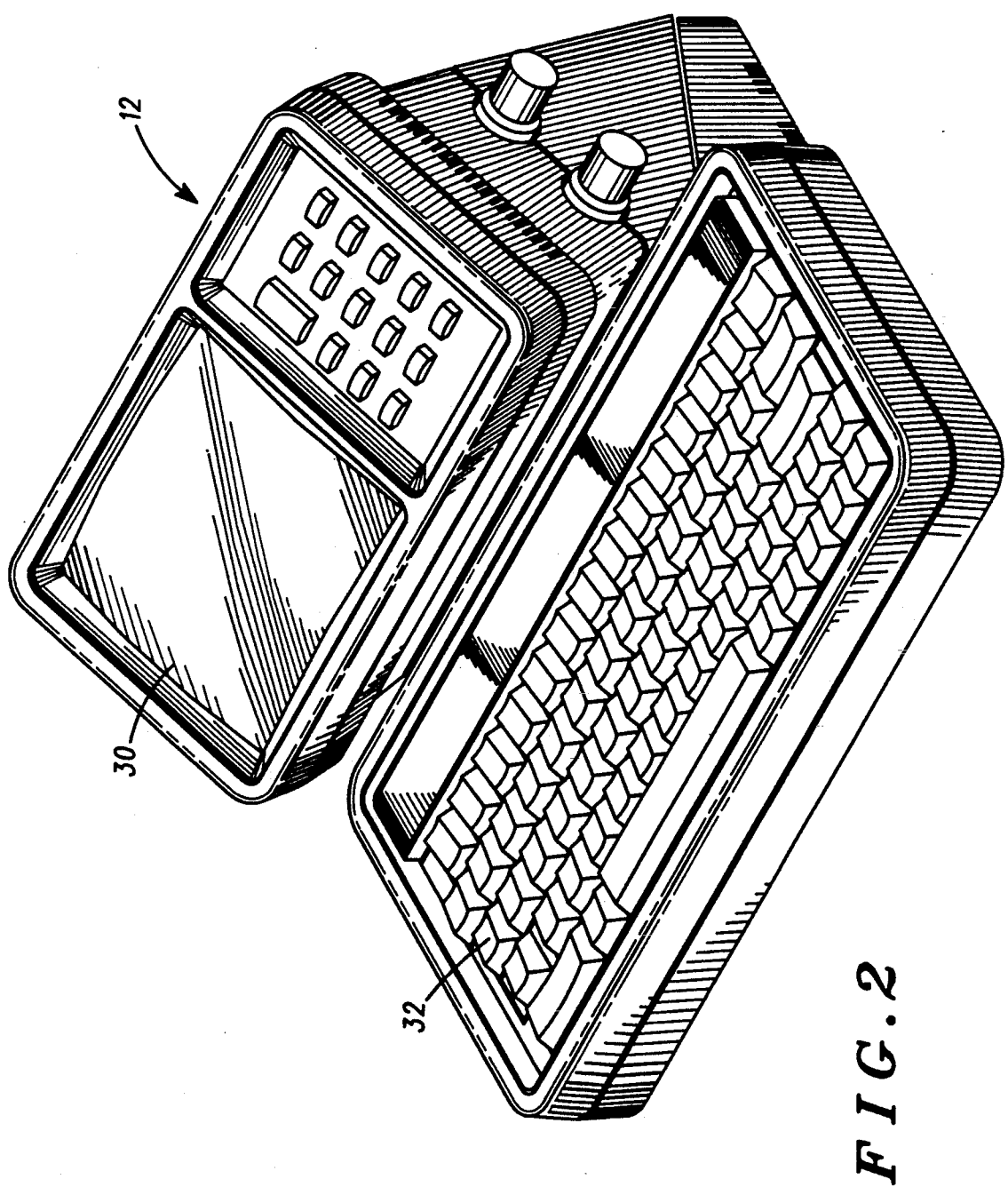
FIG. 2 is a graphic representation of a Mobile Radio Data Terminal which has been constructed in accordance with the present invention.
Figure 3:
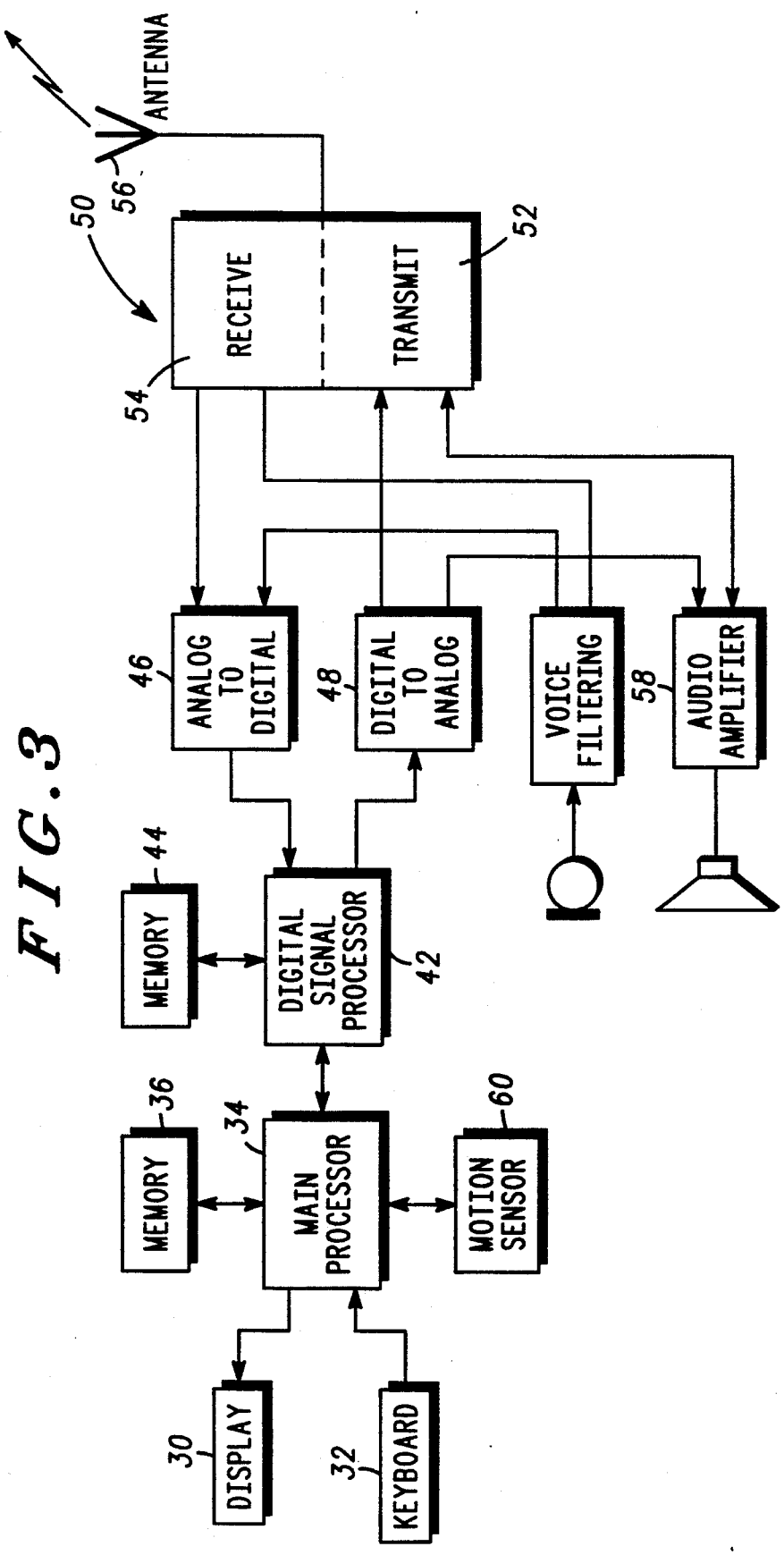
FIG. 3 is a block diagram of constituent elements comprising the Mobile Radio Data Terminal of FIG. 2.

The Mobile Radio Data Terminal 12 itself, as shown in FIGS. 2 and 3, includes a Display Screen 30, a Keyboard 32, a Processor (CPU) 34 with Memory 36 as shown in FIG. 2 in block diagram configuration. Also included is a Radio Modem 40 in the form of a Digital Signal Processor 42 together with the associated Memory 44, as well as Analog-to-Digital and Digital-to-Analog Converters 46 and 48. The modem apparatus 40 operates in conjunction with an associated Radio Receiver Unit 50 consisting of a Transmitter 52, Receiver 54 and Antenna Structure 56. There is also an Audio Amplifier 58, as shown, connected to a loud speaker (not shown).

Finally, the Mobile Radio Data Terminal 12 includes a Motion Sensor, indicated generally at 60. It is the inclusion of the Motion Sensor and associated audible alerting provision to be discussed subsequently that gives rise to the present invention and its attendant advantages and features.

In conventional operation, messages from the Host Computer 14 that are received by the particular Mobile Radio Data Terminal 12 are processed internally and, inter alia, graphically portrayed on the Display Screen 30 thereof. In another aspect, messages to be initiated by the Mobile Radio Data Terminal 12 or first inputted to the terminal by the Keyboard 32.

As can be appreciated and as previously mentioned, the foregoing is entirely satisfactory while the vehicle in which the Mobile Radio Data Terminal 12 is installed remains in a stationary condition and the user may devote his or her full attention thereto. Conversely, an unsafe condition is presented if the vehicle is in motion due to the simple fact that the attention of the user/driver must now be divided. It is unsafe for the driver/user to divert his vision from the road to the display screen and it is even more of a potential hazard for such driver/user to attempt utilization of the terminal keyboard while such vehicle is moving. To eliminate the referenced hazards, the present invention includes an automatic screen blanking and keyboard deactivation arrangement whenever the associated vehicle is in motion. Vehicular movement is sensed by the Motion Sensor 60 and inputted to the main Processor 34 which effects the necessary screen blanking and keyboard deactivation action.

The Motion Sensor 60 may be implemented in a number of alternative but satisfactory configurations. It can count revolutions of the speedometer cable, or wheel revolutions. Alternatively, it may be adapted to interface directly with the transmission of the vehicle as is frequently effected with present day cruise control modules for vehicular operation. It may also utilize the Radio Unit 50 itself in the Radio Data Terminal 12 to sense differences in the radio channel propagation characteristics, as set forth with particularity in a copending application, Ser. No., 623,836, filed Dec. 5, 1990 and assigned to the same assignee as the present invention. In any event, and however implemented, Motion Sensor 60 is effective to provide to the main Processor 34 a definitive signal so as to specify whenever the vehicle is in motion and, further, when it is in fact stationary.

However, and as also previously referenced, simply blanking the display screen and deactivating keyboard input is not enough for effective and efficient operation. Should a message be received by the Mobile Data Terminal 12 during the time the vehicle is in motion, and thus in the blanked display screen mode, the user/driver should nevertheless be so advised of such message receipt. This is effected in the present invention by the main processor (CPU) 34 generating an appropriate signal to the Audio Amplifier 58 and, in turn, reproduced in the loud speaker. At the same time, if desired, a further information signal may be extracted by the Processor 34 from Memory 36 which is likewise reproduced in the speaker which will then indicate verbally some aspect or nature of the received message.

Figure 4:
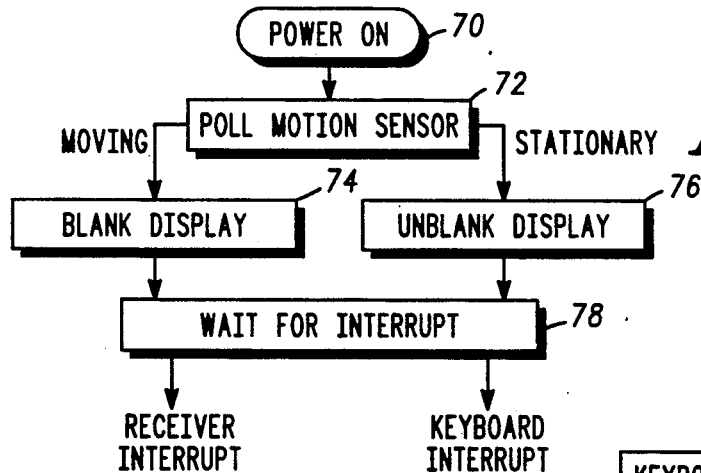
FIG. 4 is a generalized flow chart of the automatic screen blanking program provided for the Mobile Radio Data Terminal of FIGS. 2 and 3 during vehicular motion.

In operation, upon power turn-on, as indicated in step 70 in FIG. 4, the Motion Sensor 60 is polled at step 72. If the vehicle is being detected as moving by Sensor 60, the appropriate signal is generated to effect blanking of the Display Screen 30 at step 74. If no vehicle motion is detected, the screen is left unblanked at step 76. In either case, Terminal 12 will remain in that set condition pending the receipt of either a receiver interrupt or a keyboard interrupt. By "receiver interrupt" it is meant that a radio message is received by Terminal 12 which will cause the CPU 34 to interrupt, if otherwise actively engaged, and the message to be processed and/or displayed. Similarly, by "keyboard interrupt", it is meant that a user has activated one or more of the keys on the associated Terminal Keyboard 32 which would then effect a similar interruption of the Terminal CPU 34 to now process and display the inputted information.

Figure 5:
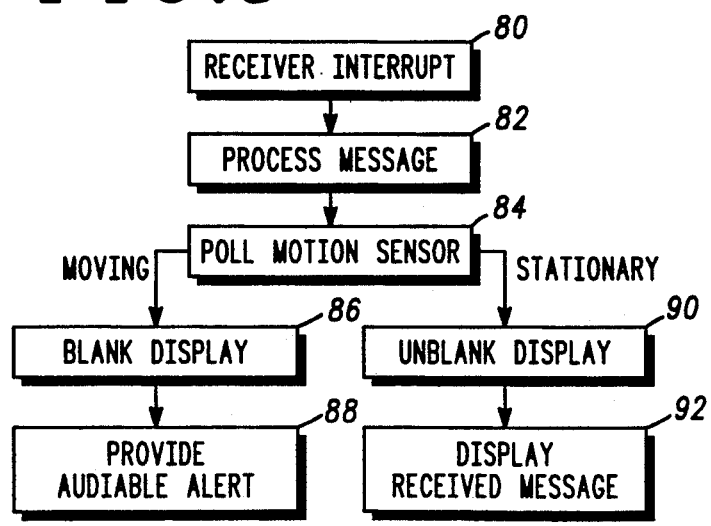
FIG. 5 is a more specific flow chart indicating the blanking and unblanking of the display screen in accordance with vehicular motion detection as well as the attendant audio alert.

If a receiver interrupt is in fact received, such as indicated at step 80 in FIG. 5, the ensuing message is processed at step 82 and the Motion Sensor 60 is polled at step 84. If vehicle motion is detected, the Terminal Screen 30 is either blanked or is maintained in the blanked condition at step 86, whereupon Terminal 12 provides an audible alert at step 88 as previously described. Optionally, the received message may be stored for subsequent attention, but in any event, the user/driver is to be advised as to some characteristic of the received message. This may be effected by utilizing different audible alerts for different types of message received, i.e., one or a plurality of beeps, different tone frequencies, and the like. Alternatively, information may be stored in the memory regarding particular types of received messages and recalled for audible reproduction following the alert referenced at step 88. In the event that the Motion Sensor 60 detects no vehicle motion at step 84, the Terminal Screen 30 is either unblanked or is maintained in the unblanked condition at step 90, whereupon the message processed by the Terminal CPU 34 may be displayed on the screen 30 at step 92.

Figure 6:
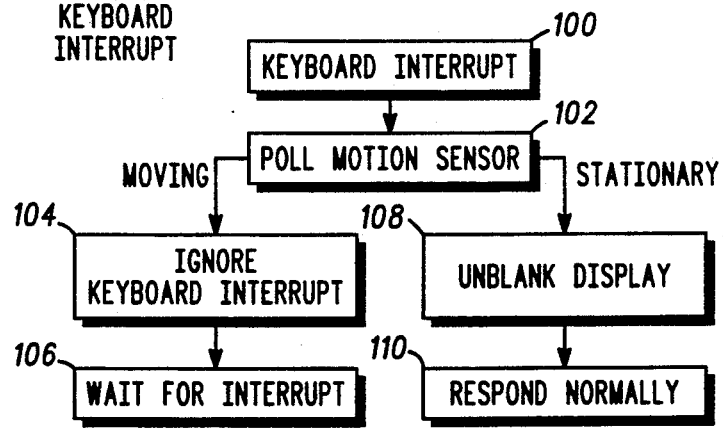
FIG. 6 is an associated flow chart showing the keyboard input deactivation during vehicular motion.

Finally, upon receipt of a keyboard interrupt such as indicated at step 100 in FIG. 6, the motion sensor is polled at step 102 and if vehicle motion is detected, such keyboard interrupt is simply ignored at step 104 and the terminal continues in otherwise normal operation, including waiting for a subsequent keyboard interrupt as indicated at step 106. If on the other hand, the Motion Sensor 60 detects no vehicle motion, the Terminal Screen 30 is either unblanked or maintained in the unblanked condition at step 108, and the terminal responds normally, including the display of the inputted information by Keyboard 32 on the Terminal Screen 30.

Accordingly, what is claimed is:

1. An improved radio data terminal device capable of radio data communication with integral keyboard and visual display suitable for vehicular use wherein screen blanking and keyboard input deactivation is effected automatically during vehicular motion, comprising in combination:

visual display means for displaying alphanumeric data information;

keyboard means for inputting said alphanumeric data information;

means for detecting vehicular motion;

means responsive to said means for detecting vehicular motion to automatically deactivate both the visual display and the keyboard during said detected vehicular motion; and means for audibly announcing any receipt of a message by the data processing device during those times when vehicular motion is being detected and said visual display and keyboard means are in the deactivated mode.

2. An improved data processing device with automatic screen blanking and keyboard input deactivation during vehicular motion in accordance with claim 1 wherein said means for audibly announcing receipt of a message during the times the visual display is deactivated includes the capability of effecting differing alerts which are to indicate differing types of messages so received.

3. An improved data processing device with automatic screen blanking and keyboard input deactivation during vehicular motion in accordance with claim 1 wherein memory means are included for storing information relating to the type of messages received and wherein such information is selectively retrieved and audibly reproduced subsequent to the activation of said alerting means.

4. An improved data processing device with automatic screen blanking and keyboard deactivation during vehicular motion in accordance with claim 1 wherein means are included whereby any keyboard interrupt is ignored during those times vehicular motion is being detected and the terminal display blanked.

5. An improved data processing device with automatic screen blanking and keyboard input deactivation during vehicular motion in accordance with claim 1 wherein means are included to poll said means for detecting vehicular motion upon terminal power-up, upon receiving a receiver interrupt signal, or upon receiving a keyboard interrupt signal.

6. In a radio data terminal device capable of radio data communication with integral keyboard and visual display suitable for vehicular use, a method of automatically blanking the screen and deactivating the keyboard whenever the vehicle is detected as being in motion, including the steps of:
  providing the capability for displaying alphanumeric data information on the visual display;
  providing the capability of inputting said alphanumeric data information by the keyboard;
  detecting any vehicular motion;
  automatically deactivating both the visual display and the keyboard during those times of detected vehicular motion; and
  audibly announcing any receipt of a message during those times of detected vehicular motion with the screen and keyboard in the deactivated mode.

7. In a data processing device with automatic screen blanking at keyboard deactivation during vehicular motion in accordance with claim 6 which includes the further step of providing the capability of audibly announcing with differing alert signals which are to indicate differing types of messages so received.

8. In a data processing device with automatic screen blanking and keyboard deactivation during vehicular motion in accordance with claim 6 providing the further step of storing information relating to the type of messages that may be received and selectively retrieving relevant information and audibly reproducing the same subsequent to the activation of the audible alert.

9. In a data processing device with automatic screen blanking and keyboard deactivation during vehicular motion in accordance with claim 6 which includes the further step of ignoring all keyboard interrupt signals during those times when vehicular motion is detected and the terminal display is blanked.

10. In a data processing device with automatic screen blanking and keyboard deactivation during vehicular motion in accordance with claim 6 which includes the further step of polling for vehicular motion detection during terminal power-up, upon receiving a receiver interrupt signal, or upon receiving a keyboard interrupt signal.

* * * * *